(12) United States Patent
Maffeis

(10) Patent No.: US 8,201,866 B2
(45) Date of Patent: Jun. 19, 2012

(54) GRIPPER DEVICE AND MODULE FOR ITS CONSTRUCTION

(75) Inventor: Giuseppe Maffeis, Roncadelle (IT)

(73) Assignee: Gimatic S.p.A., Roncadelle (Brescia) (IT)

(*) Notice: Subject to any disclaimer, the term of this patent is extended or adjusted under 35 U.S.C. 154(b) by 315 days.

(21) Appl. No.: 12/611,319

(22) Filed: Nov. 3, 2009

(65) Prior Publication Data

US 2010/0148529 A1    Jun. 17, 2010

(30) Foreign Application Priority Data

Dec. 17, 2008   (IT) .............................. BS2008A0230

(51) Int. Cl.
*B25J 15/12* (2006.01)
(52) U.S. Cl. ........... 294/196; 294/93; 294/100; 294/195
(58) Field of Classification Search .................. 294/195, 294/196, 208, 86.4, 93, 98.1, 99.1, 100; 901/37, 901/39
See application file for complete search history.

(56) References Cited

U.S. PATENT DOCUMENTS

| 2,873,996 | A | * | 2/1959 | McHugh, Jr. | 294/90 |
| 3,554,594 | A | * | 1/1971 | Thoma | 294/196 |
| 4,173,368 | A | * | 11/1979 | Haverbusch | 294/196 |
| 5,242,256 | A | * | 9/1993 | Appel | 414/416.01 |
| 5,295,723 | A | * | 3/1994 | Kronseder | 294/196 |
| 5,458,388 | A | * | 10/1995 | Danek et al. | 294/100 |
| 7,475,927 | B2 | * | 1/2009 | Maffeis | 294/93 |

\* cited by examiner

*Primary Examiner* — Dean Kramer
(74) *Attorney, Agent, or Firm* — McGlew and Tuttle, P.C.

(57) ABSTRACT

The invention concerns a gripper device for gripping solid or hollow items, objects or bodies, which includes a supporting body (11, 11*a*) holding a plurality of gripper modules (12, 12*a*) positioned around the geometric axis of the body, parallel and spaced at an angle. Each module includes a flexible prehensible arch-shaped element (21, 21*a*) having an extrados in line with a radial slot (18, 18*a*) along one side of the housing and engaged by an actuator piston. All the prehensile elements are movable between a decontracted rest condition, in which their extradossis are retracted in the respective slots (18, 18*a*), and a compressed/contracted work condition, in which their extradossis protrude from the radial slots (18, 18*a*) to engage from time to time the item, object or casing to be gripped.

9 Claims, 8 Drawing Sheets

GRIPPER DEVICE AND MODULE FOR ITS CONSTRUCTION

FIELD OF THE INVENTION CONSTRUCTION

This invention concerns in general the grippers for manipulator devices, and in particular refers to a pneumatic control gripper device able to grip items, objects and bodies on the outside or inside for displacing or handling them.

STATE OF THE TECHNIQUE

Among the means for gripping and handling items, objects and various types of bodies during their manufacturing and/or handling and assembly processes, already well known are pneumatically controlled devices that comprise a gripper element, that is prehensile, basically tubular, made of an elastomeric material, such as rubber or the like, associated with a supporting body and having a double wall so as to define an annular air chamber. When it is idle, the gripper device is deflated and remains in a contracted position; to activate it, it is inflated by blowing in a fluid under pressure, usually air, into its annular chamber through a conduct provided in the supporting body in order to expand it until it surrounds tightly the item to be gripped.

Such a device however has drawbacks at least regarding the fact that the prehensile element must have walls which are relatively thin and the working pressure must be in relation to the thickness of the walls in that if its maximum level is not limited it could break it, making the device inserviceable. So, to avoid this possibility the inflatable air chamber must also be connected to a pressure regulator, which contributes to further increasing the weight of the device.

OBJECTIVES AND SUMMARY OF THE INVENTION

An objective of this invention is to avoid the drawbacks of the known technique referred to above and to provide a pneumatically controlled gripper device with prehensile elements, not inflatable but elastically deformable by mechanical means and suitable for firmly gripping items and objects.

Another objective of the invention is to provide a gripper module to be used in plurality with others for the manufacture of gripper devices of different dimensions and configured to grip items, objects and bodies to be handled, both from the outside and from the inside of hollow.

These objectives are achieved in accordance with the invention by a gripper device that comprises a supporting body with a geometric axis and having an axial bore, a proximal part, a distal part, and wherein said supporting body presents, around said geometric axis, a plurality of parallel housings, distanced angularly and each having a radial slot that extends longitudinally for a length of its depth, in said housings as many gripper modules are housed each including a flexible arch-shaped prehensile element with an extrados or convexity in line with said slot and subject to an action of decontraction and compression/contraction, and said gripper modules can be activated simultaneously by actuating means so that all the prehensile elements are moveable between a decontracted rest position, in which their extradossis are defiladed in the respective slots, and a compressed/contracted work condition, in which their extradossis protrude from said radial slots to engage the item, object or casing to be gripped. The actuating means comprise at least one spring to maintain the rest position and an actuator piston to determine the work position of each prehensile element.

Therefore, the gripper device of the invention becomes simpler and lighter and incorporates a plurality of prehensile flexible elements with a respective control module in order to form together a contractible/expandable system. By an appropriate choice of the number of gripper modules it is possible construct devices of various dimensions in relation to the dimensions of the articles to be gripped. Furthermore, by orienting differently the prehensile elements towards the inside or outside of the supporting body, it is also possible to prepare from time to time gripper devices suitable for gripping articles on the outside or, if hollow, on the inside.

The prehensile elements can have a considerable width, and therefore be more robust, wear resistant and long lasting and efficient in time. Besides, each prehensile element can act alone or with the help of at least a spring, as an elastic means to return the device to the idle position following each activation in the presence of a single effect pneumatic actuator piston. Furthermore, every prehensile element or also the respective control module can be easily replaced without having to substitute or eliminate any other component of the device.

Also, the gripper device can operate under very high pressure, however not limited, to be able to develop higher gripper forces, in that the prehensile elements, by not having to be inflated no risk of explosion is run. This also enables the need for a pressure regulator to be avoided, besides which is expensive, as is required for the above mentioned gripper device belonging to the known technique.

Furthermore, the prehensile elements are activated by mechanical devices whose position is always detectable by certainty, even electronically by position sensors. Therefore, it will be possible to control at any time the active and passive strokes of the device, and consequently the level of expansion of the prehensile elements to vary and establish the gripper force of the objects to be handled, it being possible to adjust it depending on their receptivity, their thickness, weight, etc.

BRIEF DESCRIPTION OF THE DRAWINGS

Greater details will however become more evident from the continuation of this description carried out in reference to the enclosed indicative and not limiting drawings, in which.

DETAILED DESCRIPTION OF THE INVENTION

Figure 1:
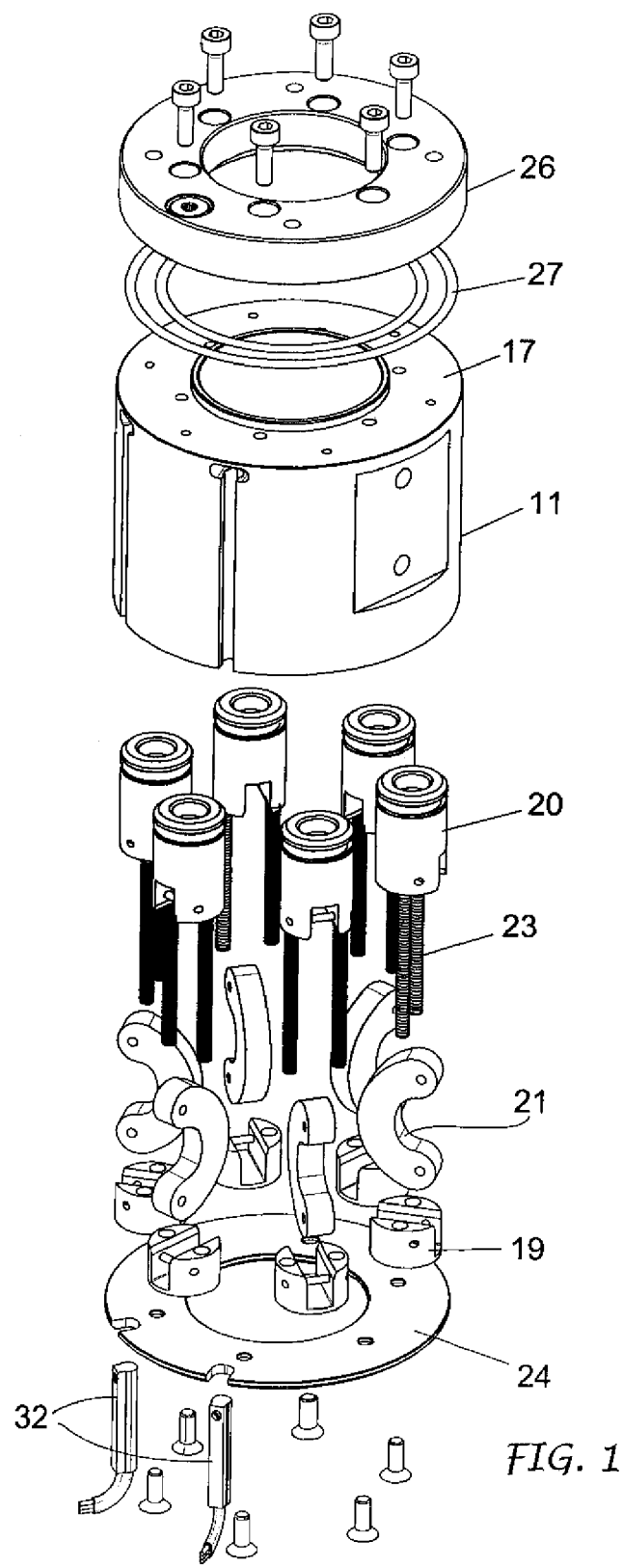
FIG. 1 is a exploded view of the components of a gripper device according to the invention for gripping bodies on the outside.
Figure 2:
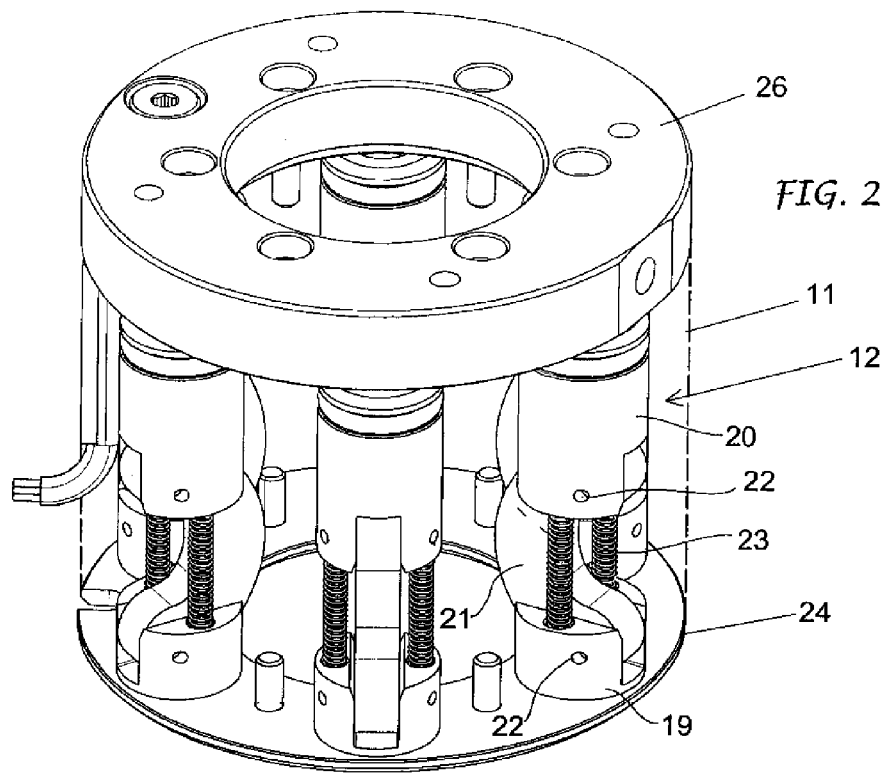
FIG. 2 is a view of the whole of the gripper device, but without a body enclosing the gripper modules.
Figure 3:
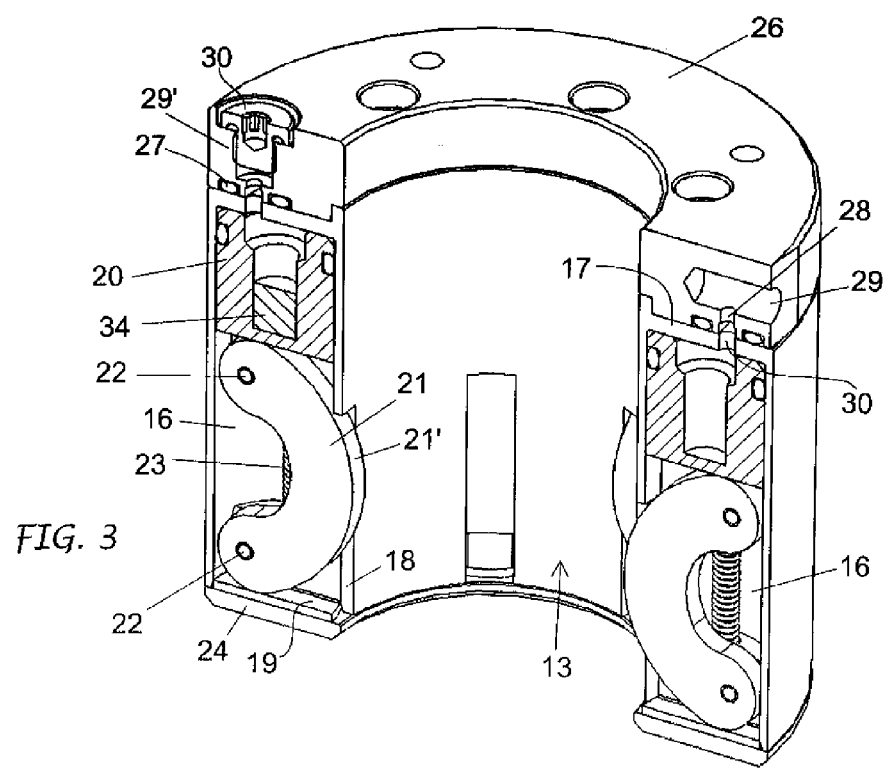
FIG. 3 is an axial section of the assembled device.
Figure 4:
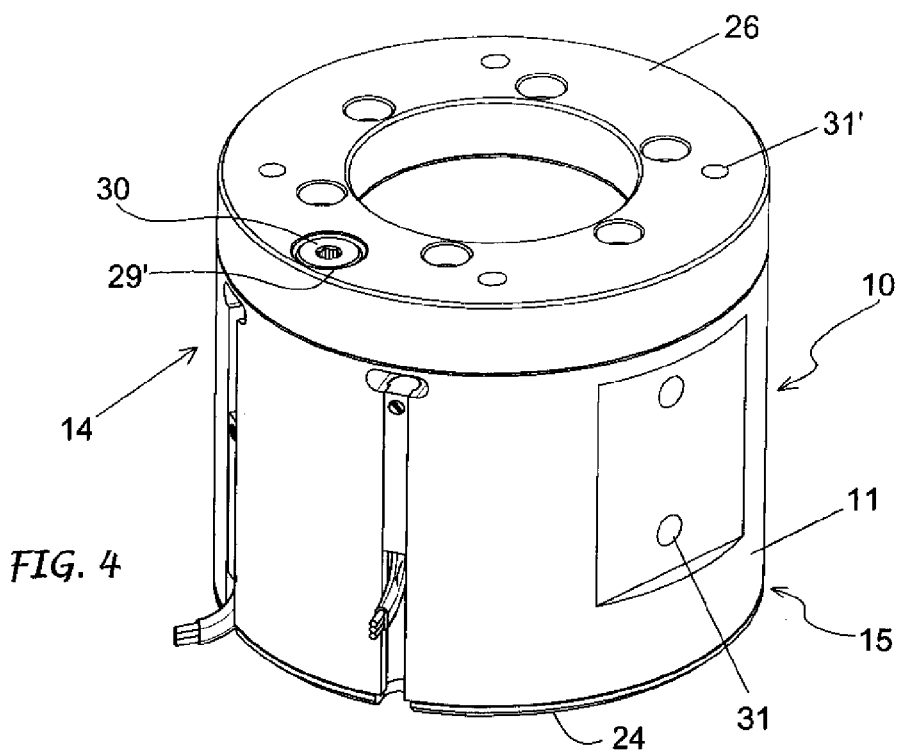
FIGS. 4 and 5 are external views in perspective, from different angles, of the assembled device.
Figure 5:
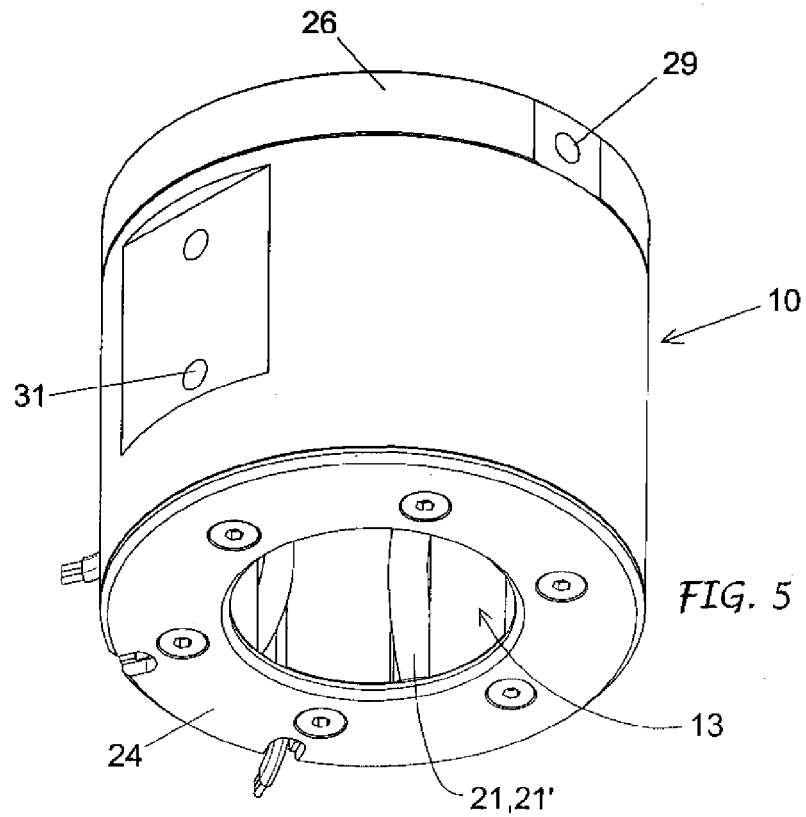
Figure 6:
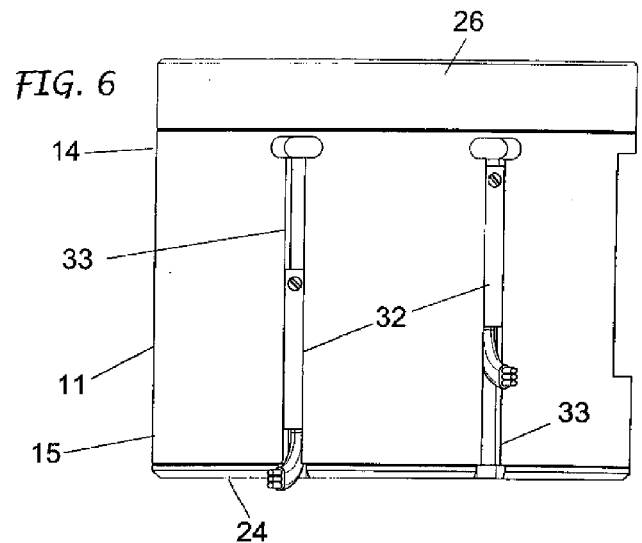
FIG. 6 is a front view of device for gripping an item on the outside.
Figure 7:
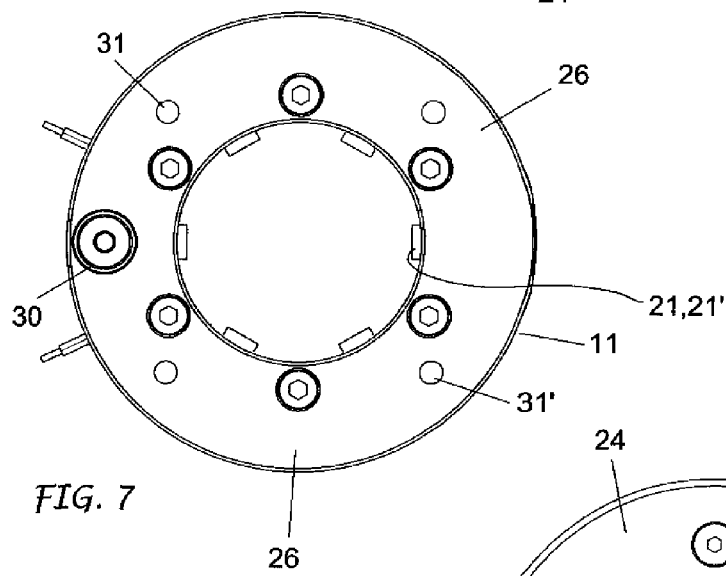
FIGS. 7 and 8 are views from a top and a bottom of the device in FIG. 6.
Figure 8:
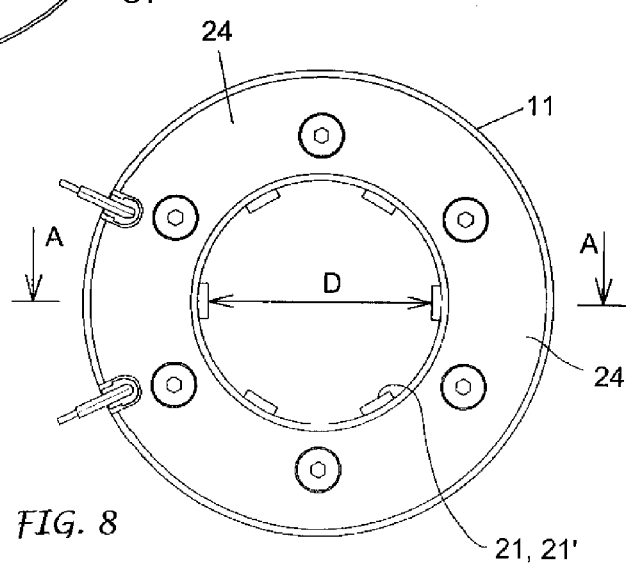
Figure 9:
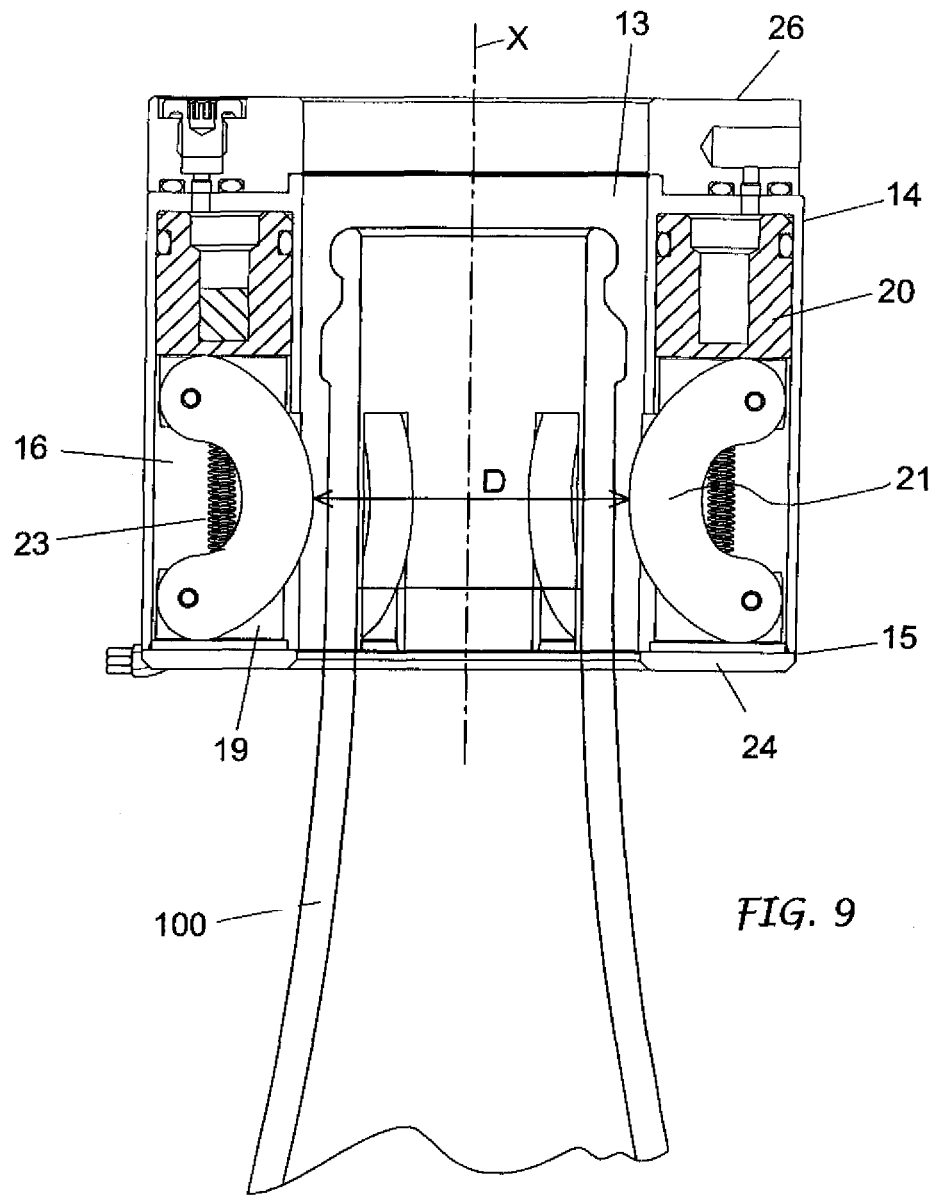
FIG. 9 is an axial section of the device in an idle position, according to arrows A-A in FIG. 8.
Figure 10:
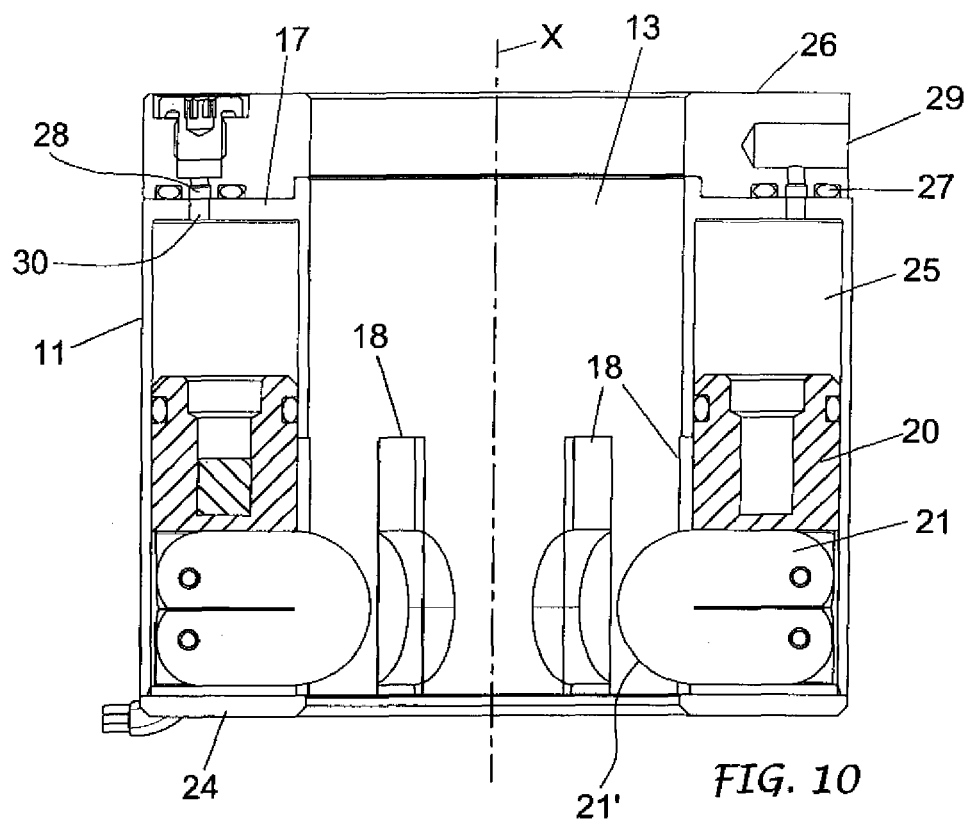
FIG. 10 is an analogous axial section of the device, but in an active position.
Figure 11:
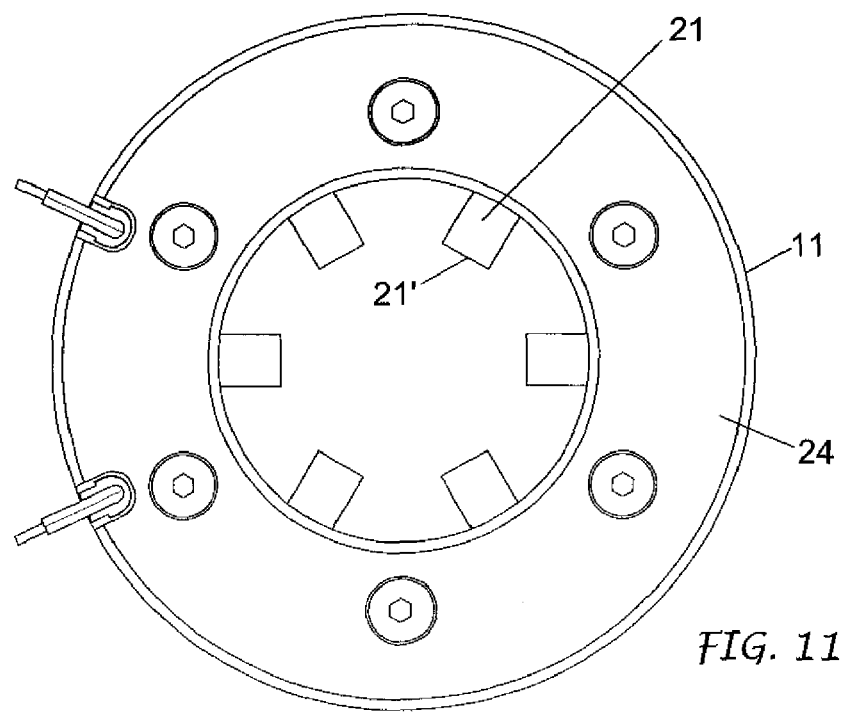
FIG. 11 is a view from the base of the device in the position of FIG. 10.
Figure 12:
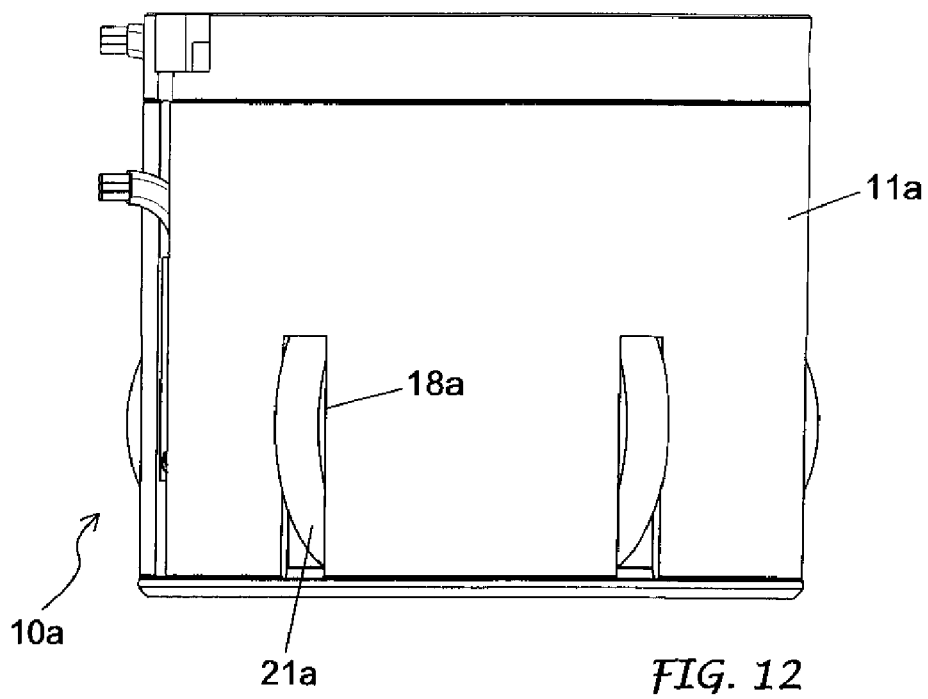
FIGS. 12 and 13 are, respectively, the front and bottom views of a gripper device designed for gripping hollow bodies on the inside.
Figure 13:
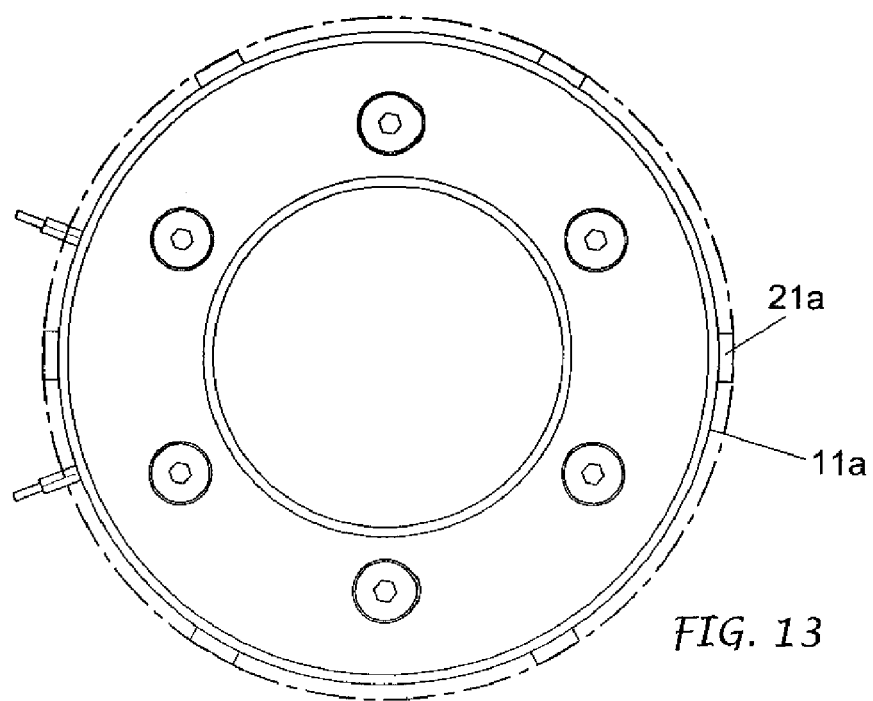
Figure 14:
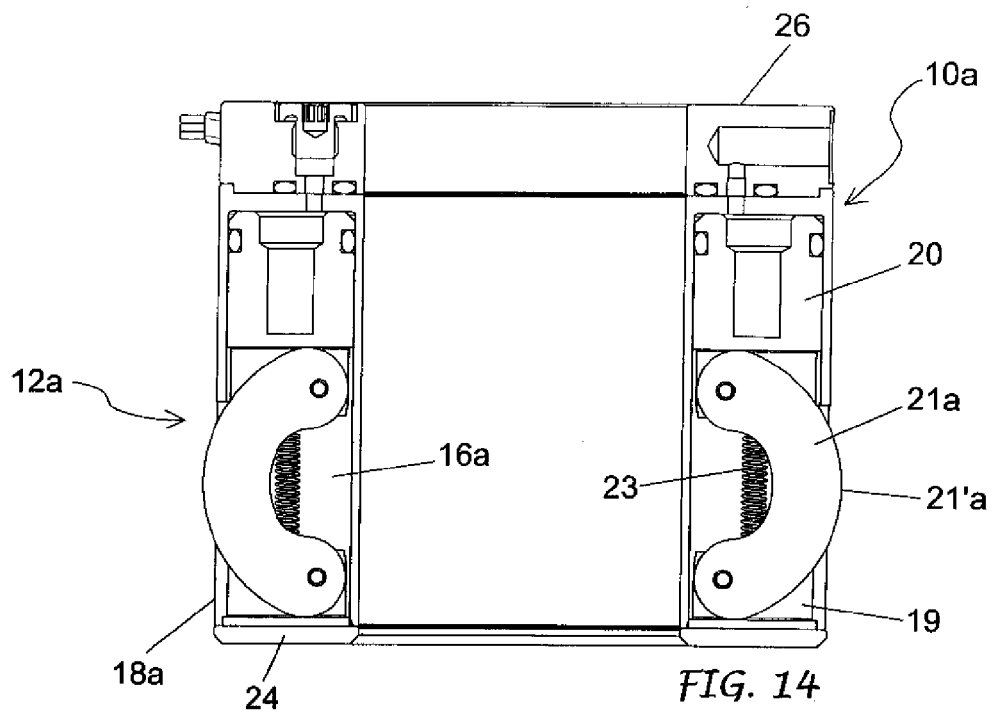
FIGS. 14 and 15 are two sections of the device of the FIGS. 12 and 13 in the idle and active positions, respectively.

FIGS. 1-11 show gripper device 10 in a version to grip items, objects or bodies 100 on the outside. It is basically made up of a supporting body 11 and a plurality of identical gripper modules 12.

The supporting body 11 has its own geometric X axis and has an axial bore 13, a proximal part 14, a distal part 15; externally, it can be of any shape, but preferably cylindrical. In the supporting body 11, around the axial bore 13, several housings 16 are provided, the number depending on requirements and the dimensions of the device, which will be in relation to the dimensions of the items, objects or bodies to be gripped. In the example illustrated there are six housings 16, parallel to the X axis and distanced at an angle. Every housing 16 is closed at the supporting body proximal end by bottom wall 17, whereas it is open both at its distal end 15 of said body 11 and towards the axial bore 13 through a radial cleft or slot 18. The latter extends longitudinally for a length of the depth of the housing itself starting from the distal end of said body 11.

The gripper modules 12 are housed individually in a respective housings 16 and are therefore also parallel and distanced one from the other around the axial bore 13 of the supporting body 11.

Each gripper module 12 comprises a foot 19, an actuator piston 20, a flexible prehensile element 21 placed between the foot 19 and the actuator piston 20, constrained to them by pins or pegs 22, and one or two compressed return springs 23 also placed between the foot and the actuator piston.

The prehensile element 21 is in the shape of an arch, made using a flexible material, such as silicon, rubber, polyurethane or some other, and can be provided with a variable section as regards to dimensions and configurations depending on the articles the device has to grip and the gripping force that has to be developed.

The gripper modules 12 are housed in the respective housings 16 passing through their distal opening and are all detained in said housings by an annular lockup flange 24 fixed to the end 15 of the supporting body 11. When each gripper module 12 is inserted in the respective housing 16: its foot 19 rests on said distal lockup flange 24; the prehensile element 21 is on a level with said radial cleft or slot 18 with its extrados 21' facing radially towards the axial bore 13 of the supporting body 11; the actuator piston 20 is located and moveably held in a part of said housing 16 not involved with the radial cleft or slot 18. This is such so that between the head of the piston 20 and the bottom wall 17 of the housing 16 there is a chamber 25 designed to receive a thrust fluid, as a rule compressed air, coming from a feeding source—not shown—and designed to cause the operating movements of the actuator pistons 20.

At the proximal end of the supporting body is fixed a flange head 26 with the interposition of seals 27.

This flange head 26 delimits an annular conduit 28, that extends from a feed passage 29 connectable to the source of pressurized fluid and which communicates through the exit bores 30, with the chambers 25 in which the actuator pistons of the gripper modules operate for the distribution of the fluid in all the chambers at the same time. The feed passage 29 can be on one side of the flange head 26 or, as shown in the drawings, the flange head 26 can also be provided with two feed passages 29, 29', one on the side, the other on the head to be used as an alternative, closing from time to time the passage not being used with a plug 30.

The body 11 of the device will furthermore be provided with appropriate means, in particular threaded holes 31, 31' for its application, for example by means of screws, to any type of robot or handling device, said bores being able to be provided on the side of the body and/or on its flange head.

In each gripper module, the springs 23 are provided to move and maintain the actuator piston 20 in a normal idle position, retracted, away from the foot 19, and the prehensile element 21 in a decontracted condition, that is to say extended, at rest. In this condition the prehensile elements 21 are idle, basically placed in the respective radial slots 18 and defining between them an axial opening with a maximum D span—FIG. 8, 9—designed to receive at least a part of the item, object or casing 100 to be gripped. Starting from this condition, the device 10 is activated by feeding the fluid under pressure to the chambers 25 in order to move at the same time all the actuator pistons 20 in the direction to cause a compression/contraction of the prehensile elements 21, which by bending protrude radially from the respective slots towards the X axis, reducing the D span they define so as to tightly grip from the side of their extrados 21' the part of the item, object or casing 100 inserted in the opening. On ceasing the fluid delivery to the chambers 25, the actuator pistons, pushed by the respective springs 23, return to the initial rest position, releasing in this way the item, object or casing in the position wanted.

FIGS. 12-15 show a gripper device 10 in a version to grip from the inside the versions of the items, objects or bodies equipped with a cavity.

Figure 15:
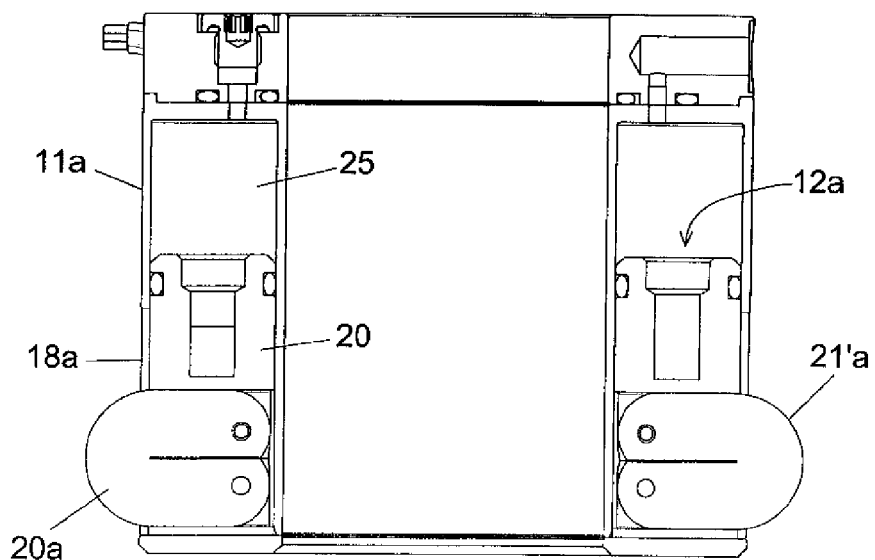

The device is analogous to the one described above and therefore comprises a supporting body 11a and a plurality of gripper modules 12a with the only difference that the body 11a has housings 16a each with a radial slot 18a that opens towards the outside of the body and that the prehensile element 21a of each gripper module 12a has an extrados 21'a on a level with said radial slot 18a and therefore designed to protrude radially towards the outside of the body 11a when the device is activated—FIG. 15—after being inserted into a cavity of the item, object or body to be gripped.

Finally it should be noted that in both versions of the device, the stroke of the actuator pistons in the relative chambers, and correspondingly the compression/contraction level of the prehensile elements, can be controlled and managed by electronic sensors 32 positioned in at least one groove 33 on the outside of the supporting body 11, 11a and interacting with a magnetic element 34 placed also on board only one of the actuator pistons given that they always move simultaneously.

The invention claimed is:

1. A gripper device for gripping items, objects or bodies to be handled or moved, the gripper device comprising:
  a supporting body with a geometric axis and having an axial bore (13), a proximal part and a distal part, said supporting body having, around said geometric axis, a plurality of housings parallel to each other, angularly separated and each of said housings having a radial cleft extending longitudinally, and in said housings being housed a same number of gripper modules, each one of said gripper modules including a flexible arch shaped prehensile element having an extrados or convexity in line with said radial cleft said gripper modules being simultaneously activated by an actuation means such that all the prehensile elements are movable between a relaxed rest condition, in which said extradoses are defilated in the respective clefts, and a compressed/contracted work condition, in which said extradoses protrude from said radial clefts to engage the item, object or body to be gripped, said actuation means comprising at least one spring to maintain the rest position and an actuator piston to set the work position of each prehensile element.

2. A gripper device according to claim 1, wherein the prehensile element and the return springs of each gripper module are held between the actuator piston and a rest foot.

3. A gripper device according to claim 2, wherein each housing is closed by a bottom wall on the proximal part whereas said housing is open on the distal end of the support body, wherein the gripper modules are housed and held in said housing by an annular closing flange fixed to the distal end of the supporting body, and the rest foot of each gripper module being arranged on said closing flange, the prehensile element being on a level with said radial cleft, and the actuator piston being positioned and moving but sealed in a part of said housing not involving the radial cleft, said actuator piston having a head that forms together with the bottom wall of the housing a chamber designed to receive a thrust fluid, in a direction to cause the respective prehensile element to move from the rest position to the work position.

4. A gripper device according to claim 3, wherein the proximal end of the supporting body is provided with a head flange forming an annular conduit that extends from a feed passage connectable to the thrust fluid source and in fluid communication with the chambers in which the actuator pistons of the gripper modules operate for the simultaneous distribution of the fluid in all the chambers.

5. A gripper device according to claim 1, wherein the prehensile element of each gripper module is made of a flexible material and has an arched shape with an extrados or convexity on a level with and protruding from the respective radial cleft when the gripper device is operating.

6. A gripper device according to claim 5 and provided for gripping items, objects or bodies from the outside, wherein the radial clefts are open towards the axial bore of the supporting body, and the extradoses or convexity of the prehensile elements (21) are facing towards and protrude in said axial bore.

7. A gripper device according to claim 1, used to grip items, objects or bodies with a cavity from the inside, wherein the radial clefts are open towards the outside of the supporting body, and the extradoses or convexities of the prehensile elements are facing towards and protruding from the outside of said body.

8. A gripper device according to claim 1, wherein the supporting body has a connecting means for application to a manipulator device, said connecting means being one or more of on at least one side of the supporting body and on a head flange of the supporting body.

9. A gripper device according to claim 1, wherein the supporting body is provided with electronic sensors interacting with a magnetic element placed on at least one of the actuator pistons to control at least a stroke of one or more of the actuator pistons in an operating direction of the gripper device.

\* \* \* \* \*